(12) United States Patent
Pausch et al.

(10) Patent No.: US 9,132,470 B2
(45) Date of Patent: Sep. 15, 2015

(54) SUPPORT TUBE FOR MOTOR-VEHICLE ACCESSORY AND METHOD AND APPARATUS FOR MAKING A RECESS THEREIN

(75) Inventors: Friedhelm Pausch, Amberg (DE); Markus Hoffmann, Kuemmersbruck (DE)

(73) Assignee: GRAMMER AG, Amberg (DE)

( * ) Notice: Subject to any disclaimer, the term of this patent is extended or adjusted under 35 U.S.C. 154(b) by 794 days.

(21) Appl. No.: 12/559,582

(22) Filed: Sep. 15, 2009

(65) Prior Publication Data

US 2010/0230573 A1    Sep. 16, 2010

(30) Foreign Application Priority Data

Sep. 16, 2008 (DE) .......................... 10 2008 047 531

(51) Int. Cl.
*B21D 53/88* (2006.01)
*B21D 22/02* (2006.01)
*B60N 2/48* (2006.01)

(52) U.S. Cl.
CPC .............. *B21D 53/88* (2013.01); *B21D 22/025* (2013.01); *B60N 2/4817* (2013.01); *Y10T 29/49826* (2015.01); *Y10T 29/5185* (2015.01)

(58) Field of Classification Search
CPC ................. Y10T 29/5185; Y10T 403/32434; Y10T 403/32451; Y10T 403/606; B60N 2/4817
USPC ............... 248/407, 408, 161; 297/410, 463.1, 297/463.2; 72/370.21, 370.16, 370.19, 72/370.2, 370.04, 368; 292/145, 147, 150, 292/302
See application file for complete search history.

(56) References Cited

U.S. PATENT DOCUMENTS

| 3,512,832 | A | * | 5/1970 | Kage | 297/410 |
| 3,512,833 | A | * | 5/1970 | Sugiura | 297/410 |
| 3,542,429 | A | * | 11/1970 | Inoue et al. | 297/410 |
| 3,572,834 | A | * | 3/1971 | Herzer et al. | 297/410 |
| 3,921,450 | A | * | 11/1975 | Pfister | 73/295 |
| 4,390,209 | A | * | 6/1983 | Izuno et al. | 297/410 |
| 4,513,488 | A | * | 4/1985 | Arena | 29/516 |
| 4,671,573 | A | * | 6/1987 | Nemoto et al. | 297/410 |
| 5,174,676 | A | * | 12/1992 | Welsch et al. | 403/14 |
| 5,784,918 | A | * | 7/1998 | Shao-Chien | 72/370.04 |
| 5,816,658 | A | * | 10/1998 | Wallis | 297/410 |
| 5,895,094 | A | * | 4/1999 | Mori et al. | 297/410 |
| 5,934,755 | A | * | 8/1999 | Halamish | 297/410 |
| 6,170,313 | B1 | * | 1/2001 | Vasseur et al. | 72/312 |
| 6,442,992 | B2 | * | 9/2002 | Tsubouchi et al. | 72/370.21 |
| 6,505,493 | B2 | * | 1/2003 | Nakane et al. | 72/370.21 |

(Continued)

FOREIGN PATENT DOCUMENTS

DE       29714355 U1 * 10/1997
DE    102006062241 A1 *  6/2008

(Continued)

*Primary Examiner* — Kimberly Wood
(74) *Attorney, Agent, or Firm* — Andrew Wilford

(57) ABSTRACT

A support tube adapted to carry a motor-vehicle accessory and to slide in a bearing tube provided with a latch element is hollow, cylindrical, centered on an axis, and formed with a plurality of outwardly open notches. These notches are each in turned formed by a flat latch face extending generally perpendicular to the axis, an outwardly open indent adjacent the latch face, a cam face extending from the latch radially outward to an outer surface of the tube, and a flat base face extending generally parallel to the axis from an inner edge of the latch face to an inner edge of the cam face.

8 Claims, 3 Drawing Sheets

(56) References Cited

U.S. PATENT DOCUMENTS

| | | | |
|---|---|---|---|
| 7,121,626 B2 * | 10/2006 | Akehi et al. | 297/410 |
| 7,204,558 B2 * | 4/2007 | Tanaka | 297/410 |
| 7,216,937 B2 | 5/2007 | Key | |
| 7,309,108 B2 * | 12/2007 | Tsutsui et al. | 297/410 |
| 7,621,286 B2 * | 11/2009 | Frei et al. | 134/129 |
| 7,758,089 B2 * | 7/2010 | Lee et al. | 293/102 |
| 7,950,153 B2 * | 5/2011 | Dohmann | 29/897.2 |
| 8,047,611 B2 * | 11/2011 | Ichisugi et al. | 297/410 |
| 8,056,984 B2 * | 11/2011 | Hentschel et al. | 297/410 |
| 8,176,763 B2 * | 5/2012 | Eckstein | 72/368 |
| 2005/0034499 A1 * | 2/2005 | Matsumoto | 72/214 |
| 2009/0139366 A1 * | 6/2009 | Matsuhisa | 74/531 |

FOREIGN PATENT DOCUMENTS

| | | | |
|---|---|---|---|
| DE | 102006062242 A1 * | 6/2008 | |
| DE | 102007018919 A1 * | 10/2008 | |
| EP | 0322373 A1 * | 6/1989 | |
| EP | 744316 A1 * | 11/1996 | |
| EP | 1741497 A | 1/2007 | |

\* cited by examiner

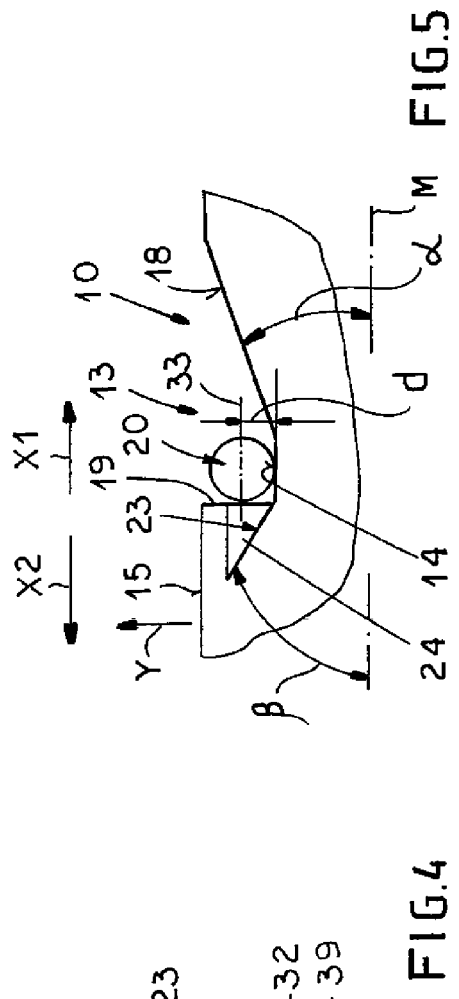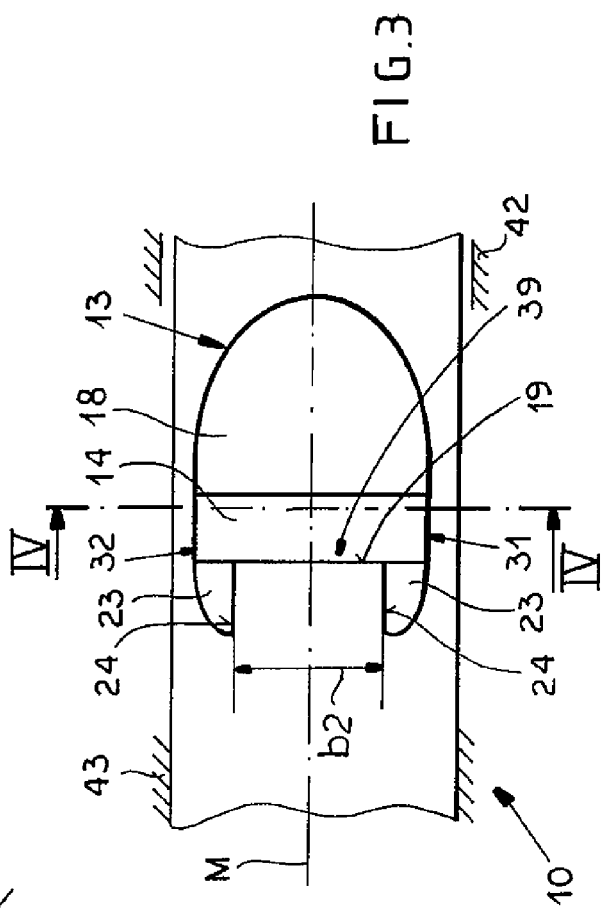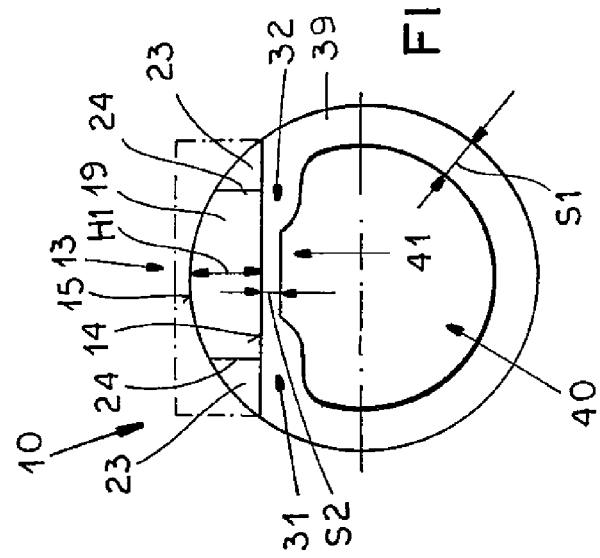

SUPPORT TUBE FOR MOTOR-VEHICLE ACCESSORY AND METHOD AND APPARATUS FOR MAKING A RECESS THEREIN

FIELD OF THE INVENTION

The present invention relates to support tube for a motor-vehicle accessory. More particularly this invention concerns a support tube for a motor-vehicle headrest, and to a method and apparatus for making this support tube.

BACKGROUND OF THE INVENTION

A motor-vehicle headrest is typically supported on a pair of support tubes whose upper ends are fixed in the headrest and whose lower ends are slidable in respective vertical sleeves set in a seat back. At least one of the tubes is formed with an array of outwardly open notches into which can fit an element of a latch provided in the seat back. The notches typically are formed with a downwardly facing latch face that lies in a plane generally perpendicular to the axis of the tube and a cam or ramp face that extends radially outward from the base of the latch face to the cylindrical outer surface of the tube, forming a small acute angle with the tube axis. A small intermediate surface lying in a plane parallel to the axis may extend from the inner edge of the latch face to the inner edge of the cam or ramp face. The latch element that fits in these notches to prevent downward displacement of the headrest is typically spring-biased against the tube so that the tube can be moved up without radially retracting the latch element but can only be moved down when the element is retracted radially outward away from the tube. In this way the headrest can be raised to a desired position without actuating the latch but can only be moved back down when the latch is actuated.

The use of a tube rather than a solid rod has the advantage that weight can be reduced. Furthermore, the material, being displaced during the formation of the notch in a solid rod would project beyond the outer contour of the support rod and must therefore be removed utilizing an additional manufacturing step, for example, by machining. In a support tube the material may be displaced into the interior of the tube such that no subsequent machining is necessary.

The formation of the notches is carried out by a die that is pressed against the outside of the tube and whose end corresponds to the outside surfaces of the notch and a mandrel that fits inside the tube and whose surface is formed with recesses corresponding to the inside surface of the tube at the notches to be formed. The die has a plane surface which forms the intermediate surface at the base of the latch face and a planar surface adjacent that forms the ramp. The formation of tears—particularly, if the notch depth is greater than the wall thickness of the tube—often occurs in the corner between the notch bottom and the latch face.

Depending on the circumference of the tear formation the quality of the support rod has been previously reduced, or has resulted in rejection of the finished support tube, which in turn resulted in high costs depending on the support rod material and manufacturing steps.

OBJECTS OF THE INVENTION

It is therefore an object of the present invention to provide an improved support tube for a motor-vehicle accessory.

Another object is the provision of an improved support tube for a motor-vehicle accessory that overcomes the above-given disadvantages, in particular that can be produced without waste or unwanted damage to the tube.

A further object is to provide an improved method of and apparatus forming such a tube.

SUMMARY OF THE INVENTION

A support tube adapted to carry a motor-vehicle accessory and to slide in a bearing tube provided with a latch element is hollow, cylindrical, centered on an axis, and formed with a plurality of outwardly open notches. These notches are each in turned formed by a flat latch face extending generally perpendicular to the axis, an outwardly open indent adjacent the latch face, a cam face extending from the latch radially outward to an outer surface of the tube, and a flat base face extending generally parallel to the axis from an inner edge of the latch face to an inner edge of the cam face.

The first principle of the invention relates to the fact that the recess, which must be flush with the tube, must be configured in a less sensitive manner, in that at least one support tube area laterally of the latch face is formed with an indent. Due to the indent, additional support rod material is displaced into the side areas of the latch face. The additional material is created by the partial shaping of the radius-shaped support tube into a planar area, material excess being created in these areas in a locally limited manner.

An accessory of a vehicle interior can be, for example, a head rest that is supported on the back rest of a vehicle seat by a support tube.

The latch element in the sense of the invention may be, for example, a wire element engageable in the recess of the support tube. The latch element may be embodied, for example, as a spring element that can be snapped into the recess. As an alternative, the latch element may be embodied, for example, by a rigid element that can be moved into the recess.

The latch face in the sense of the invention is a surface of the recess that prevents movement of the support tube in at least one direction, if the latch element is arranged in the recess. If the support tube is supported, for example, in the direction of the longitudinal axis thereof in a bearing device, a plane being formed by the latch face may be arranged, for example, substantially perpendicular to the longitudinal axis of the support tube.

The indent in the sense of the invention is a surface embossed into the outer surface of the support rod, laterally adjacent the latch face. For example, indents may be arranged on both sides of the latch face. When embossing the indent the outer surface of the support rod, which is arched in a convex radius-shaped manner, is embossed, for example, into a planar shape.

The advantages of the invention are such that, as opposed to current manufacturing methods, the notch sensitivity of the contour and the formation of tears in the area of the recess of the support tube, are reduced drastically. The result is increased stability of the support rod, optionally having the additional advantage of lower weight of the support rod. Furthermore, liquid material, which is applied to the support rod surface, for example, in the surface treatment following the production of the recess, may not enter the interior of the support rod tube through a tear. In an optional aspect, the surface of the support tube has a more uniform quality in this way. Furthermore, the proportion of the tear described will remain without any coating. Corrosion may occur at these locations, which has a further adverse effect on the support rod with regard to stability and also with regard to appearance. Any defects due to running liquid material do not occur, and there is no longer any waste due to surface defects.

The second principle of the invention is that first of all, the embossing die comprises at least one additional third embossing area, which serves for embossing a surface arranged at least on a side area of the latch face. An additional free-form material proportion is created in the side area of the latch face by the additional embossing area, which reduces the abrupt contour transition of the support rod material in the area that is sensitive to notch tears. A further principle of the invention is that the mandrel receives an increase in the partial area of the recess bottom to build up a counter-pressure corresponding to the exterior notch depth, which reduces the ease of flow of the perpendicular material proportions, thus counter-acting the development of tears.

The advantage of the invention is that tears are avoided in the support tube by the shape of the embossing die and the mandrel according to the invention. Further advantages are described in connection with the advantages of the support tube according to the invention.

According to a third aspect of the invention the invention relates to a device that comprises an embossing tool or die having an embossing structure for embossing the recess. In order to create a counter-pressure to the embossing die, a mandrel having at least one mandrel structure is inserted into the interior of the support tube. The mandrel structure forms a counter bearing for the embossing die. The embossing die has a first area provided for forming a base face, and a second area, provided for shaping a latch face of the recess. As mentioned above, the latch face is prevents movement of the support tube in the movement direction, if a latch element is present in the recess.

During production of the recess, tears often occurred in the support tube according to the known device, which rendered the support tube useless, or had an adverse effect on the quality of the support tube.

The object of the invention is to create a device having an embossing structure, and a mandrel structure interacting with the embossing structure, for the production of a recess in a support tube, by which the sensitivity of the notch and the formation of tears can be avoided.

The principle of the third aspect of the invention is that the embossing structure and the mandrel structure have areas for forming at least one indent that laterally adjoins the latch face of the recess.

Tears can be avoided in the area of the recesses of support tubes by the device according to the invention.

According to a fourth aspect of the invention the base of the recess inside the tube is formed by a special embossing structure and a special mandrel structure such that a partial thinning of the thickness of the recess bottom occurs. This brings about a counter-pressure in this partial area, thus reducing flow of material into the corner between the recess base and the latch face. The degree of the shaping is, for example, smaller than 0.6. In this manner recess depths of 1.6 times that of the original tube wall thickness can be achieved.

A method for making the latch notches is known wherein at least one recess is embossed into a support tube by an embossing tool assembly comprising an embossing die and a mandrel serving as a counter bearing. For this purpose the mandrel was arranged inside the support tube. In order to form the recess in the support tube, an embossing structure of the embossing die was able to be moved at a defined distance to a mandrel structure of the mandrel.

It was the object to create a method, by which the formation of tears in the area of the recess of a support tube, and during the production of the recess, as well as during the stressing of the support rod in use could be avoided.

The principle of the invention is that the embossing structure of the embossing die and the mandrel structure of the mandrel interact such that the wall of the support tube in the area of the base face with regard to a thickness of the non-shaped wall of the support tube has a lower thickness.

The advantage of the invention is that tears in the support tube are avoided in the area of the recess, particularly in a corner between the latch face and the base face.

The principle of the invention is that an additional indent is embossed by the interaction of an embossing die with an embossing structure and of a mandrel with a mandrel structure in at least one lateral area of the latch face of the recess, which reduces the tendency to tears of the support rod in the area of the recess, particularly in the area of the latch face.

BRIEF DESCRIPTION OF THE DRAWING

The above and other objects, features, and advantages will become more readily apparent from the following description, reference being made to the accompanying drawing in which:

FIG. 3 is a plan view of the notch shown in FIG. 2;

FIG. 4 is a section taken along line IV-IV of FIG. 3;

FIG. 5 is a side view of the structure of FIG. 3;

SPECIFIC DESCRIPTION

Figure 1:
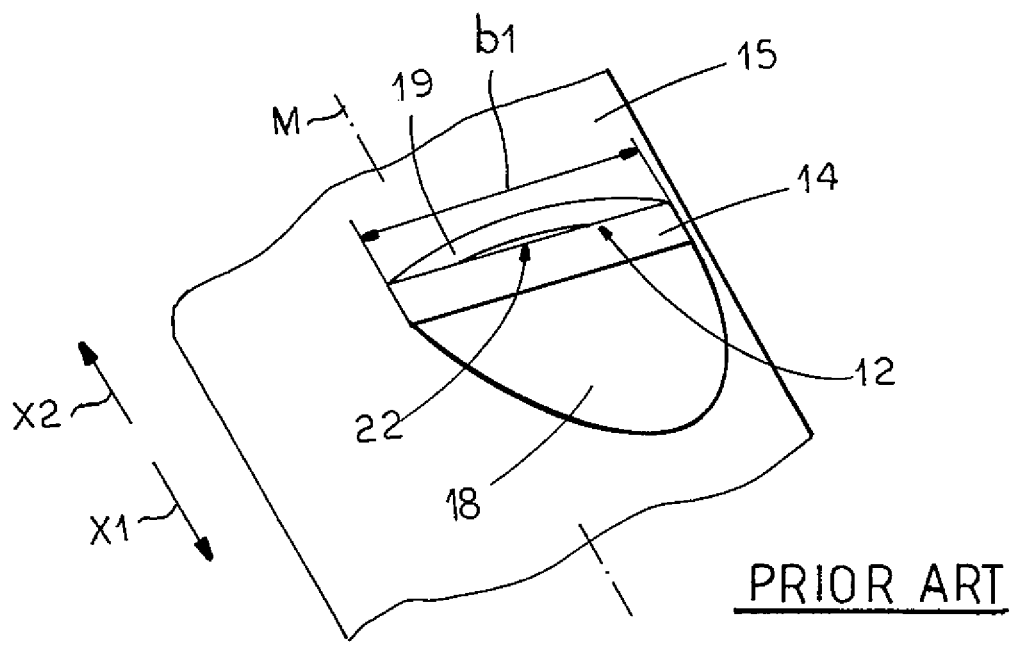
FIG. 1 is a large-scale perspective detail view of a latch notch in a prior-art support tube.
Figure 2:
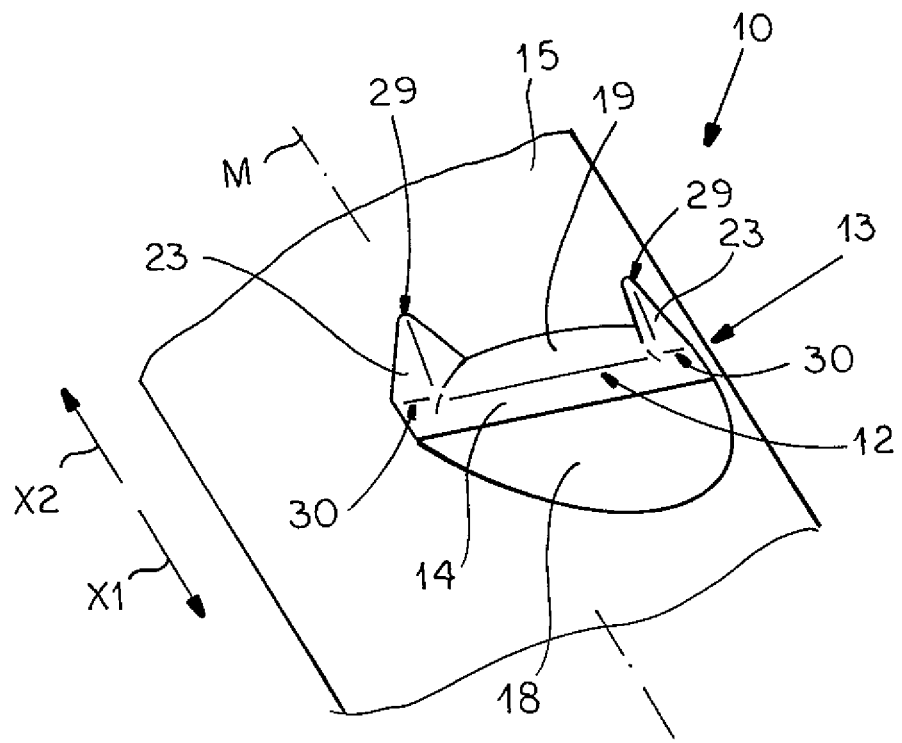
FIG. 2 is a view like FIG. 1 of the notch according to the invention.

As seen in FIG. 1 headrest support rod 10 is centered on a longitudinal axis A and is basically of cylindrically tubular shape and made of metal. The support rod 10 is supported in a bearing sleeve illustrated schematically at 42 in FIG. 3 and can be moved relative to the bearing sleeve 42 in the directions x1, x2 parallel to the axis M. Its upper end is fixed to a headrest shown schematically at 43 in FIG. 3. In order to latch the tube 10 at different height positions, the support rod 10 has multiple recesses or notches 13 of which only one is illustrated in the figure. A latch element 20 that is radially displaceable but axially fixed in the bearing sleeve 42 can be engaged in the recess 13 (see FIG. 5). This element 20 is formed where it engages the notch 13 as a cylindrical rod.

If the latch element 20 is in the recess 13, the support rod 10 cannot be moved downward in the direction x1 because a planar latch face 19 of the recess 13 comes into contact with the latch element 20 and prevents any movement by the support rod 10. An upward movement of the support rod 10 in the direction x2, however, is possible, since a planar cam face 18 of the recess 13 extending at an angle α to the longitudinal center axis M can push the latch element 20 out of the recess 13 with a force acting radially outward of the longitudinal axis M in the direction y (FIG. 5).

Such a recess 13 makes it possible to pull the support rod 10 upward in the direction x2 from the bearing sleeve 42 without any activation of the latch element 20, for example, in order to adjust the height of the head rest 43. However, downward movement of the support rod 10 in the direction x1 into the bearing sleeve 42 is prevented in order to ensure the support function in case of an impact of the head of a seat occupant.

The recess 13 in the support rod 10 has a base face 14 lying in a plane parallel to the axis M. The cam face 18, which is planar and extends at a small acute angle to this axis M, and the latch face 19, which is also planar but extends perpendicular to the axis A, flank the base face 14. In the support rod 10 according to prior art a tear 22 often forms, for example, at a corner 12 between the latch face 19 and the base face 14.

The support rod 10 according to the invention is illustrated in FIGS. 2 to 7. According to the invention the recess 13 has indents 23 (see, for example, FIG. 2). In the present illustrated embodiment the indents 23 have floors that form an angle β to the longitudinal center axis M of the support rod 10. The indents 23 have flanks 24 extending in planes parallel to the axis M. An upper end 29 of each indent 23 merges with or lies on the outer tube surface 15, and a lower end 30 opposite of the end 29 merges with the base face 14. As an alternative, the indents 23 could also have a different shape. For example, a maximum embossing depth H2 of the indent 23 could be, for example, smaller or greater than that in the illustrated embodiment.

The cylindrical outer surface 15 of the support rod 10 is embossed into a plane surface in a limited area by the indents 23 of the recess 13. Any excess support-rod material forms material accumulations in side areas 31, 32 of the latch face 19. This material accumulation is illustrated schematically in FIG. 4. The material accumulation prevents the abrupt, erratic transition of the latch face 19 through the radius-shaped outer surface 15 of the support rod 10 from forming burrs, thus is reducing the notching effect of the recess 13 on the support rod 10 when stressed.

Due to the indents 23, the latch face 19 of the support rod 10 according to the invention has a width b2 (see FIG. 3), while the latch face 19 of the support rod 10 according to FIG. 1 has a greater width b1. The latch face 19 according to the invention has a minimum height H2 that is greater than half of the height d (see center line 33) of the cylindrical latch element 20. Therefore, no forces acting upon the latch element 20 in the direction y according to FIG. 5 occur, which might deactivate engagement into the recess 13. The maximum height of the latch face 19 is denoted with H2.

Figure 6:
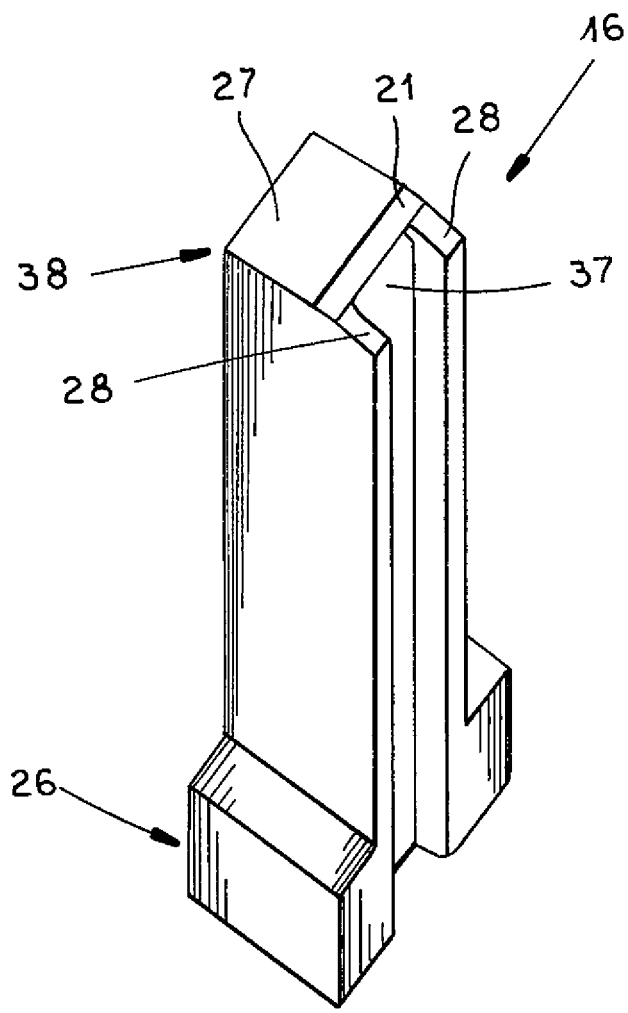
FIG. 6 is a perspective view of a die for making the inventive notch.

A tool 16 according to the invention for embossing the recess 13 into a cylindrical tube blank is illustrated in FIG. 6. This tool 16 has a rear-end bearing area 26 by which it is supported in an unillustrated embossing machine. A front-end embossing area 38 of the embossing tool or die 16 positioned opposite of the bearing area 26 is equipped with embossing surfaces 21, 27, and 28. While the embossing surface 27 is provided for embossing the cam face 18, the base face 14 is embossed with the embossing surface 21 of the tool 16. The embossing surfaces 28 are provided for embossing the indents 23. The latch face 19 is formed by a side surface 37.

Figure 7:
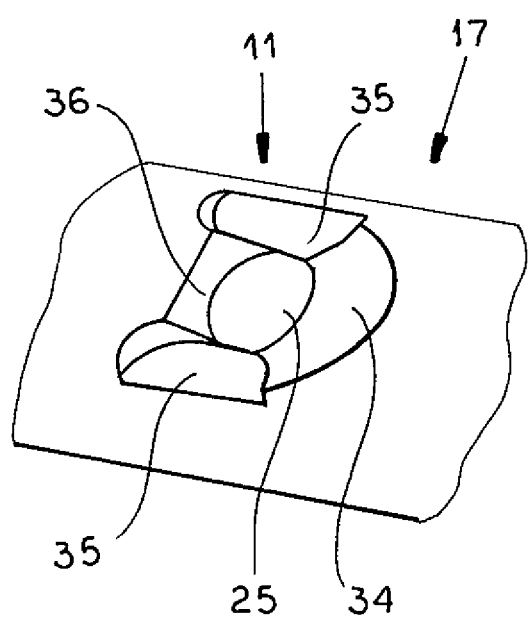
FIG. 7 is a perspective view of a detail of a mandrel used with the die of FIG. 6.

A mandrel 17 is provided as a counter bearing for the die 16 and is partially illustrated in FIG. 7. The mandrel 17 is equipped with multiple mandrel structures 11, of which only one mandrel structure 11 is illustrated. The mandrel structure 11 has counter bearing surfaces 36 and 25. The mandrel recesses 34 and 35 are recesses in the mandrel 17. The counter bearing surface 25 interacts with the embossing surface 21, and serves as a counter bearing during embossing of the base face 14.

Due to the interactions of the counter bearing surface 25 and the embossing surface 21, a region of lesser thickness s2 is created in an area 41 of the base face 14 with regard to the thickness s1 of the surrounding undeformed wall 39 of the support rod 10, which allows the support rod material to flow from this area toward the latch face 19, among others, in the direction x2. Formation of tears can be prevented in this manner, particularly in the corner 12.

The free surface 34 interacts with the embossing surface 27, and serves as an unsupported area during embossing of the cam face 18 and of the counter bearing surface 36, which interacts with the embossing surface 37, and serves as the counter bearing during embossing of the latch face 19.

The free surfaces 35 are embodied such that the support-rod material can accumulate during embossing of the base face 14, the cam face 18, and the indents 23 in the side areas 31 and 32 of the recess 13 according to FIG. 4 in order to be able to impart a formation in the interior 40 of the support rod tube 10 that naturally corresponds with the outer contour, which expressly permits the discharge of the material from the area prone to tearing at this location, thus preventing the formation of tears.

It should also be noted that as an alternative to the embodiment illustrated the recess 13 may have a second latch face 19 instead of, for example, the cam face 18. If a latch element 20 is arranged in the recess in this case, movement of the support rod 10 both in the direction x1 and in the direction x2 is prevented. In order to also prevent any tears in the second latch face 19, indents 23 may be present in the side areas 31, 32 of both latch faces 19 in this case.

We claim:

1. In combination with a motor-vehicle accessory having a bearing tube provided with a latch element, a support tube carrying the accessory and slideable in the bearing tube, the support tube being hollow, cylindrical, centered on an axis, and formed with at least one outwardly open notch comprising:

a latch face extending generally perpendicular to the axis and having a pair of angularly offset ends, and a respective outwardly open indent at each of the ends of the latch face, the indents being adjacent and flanking the latch face and opening toward a base face.

2. The combination defined in claim 1 wherein the notch further comprising a cam face extending from the latch face radially outward to an outer surface of the support tube.

3. The combination defined in claim 2 wherein the cam face forms a small acute angle with the axis.

4. The combination defined in claim 2 wherein the base face is flat and extends generally parallel to the axis from an inner edge of the latch face to an inner edge of the cam face, the indents having floors merging with the base face.

5. The combination defined in claim 4 wherein the tubular support tube has a wall thickness that is smaller at the base face than elsewhere.

6. The combination defined in claim 2 wherein the indents extend axially in one direction at the respective ends of the latch face and the cam face extends axially oppositely from the latch face.

7. In combination with a motor-vehicle accessory having a bearing tube provided with a latch element, a support tube carrying the accessory and slideable in the bearing tube, the support tube being hollow, cylindrical, centered on an axis, and formed with at least one outwardly open notch comprising:

a latch face extending generally perpendicular to the axis and having a pair of angularly offset ends;

a cam face extending from the latch face radially outward to an outer surface of the support tube;

a flat base face extending generally parallel to the axis from an inner edge of the latch face to an inner edge of the cam face, the cam face extending axially in an opposite direction from the base face; and respective outwardly open indents at the ends of the latch face, flanking the latch face, opening toward the base face, having floors merging with the base face, and extending axially in one direction from the base face, the latch face being delimited by and ending at inner edges of the indents.

8. In combination with a motor-vehicle accessory and a bearing provided with a latch element, a support tube adapted to carry a motor-vehicle accessory and to slide in the bearing, the support tube being hollow, cylindrical, centered on an axis, and formed with at least one outwardly open notch engageable with the latch element for blocking movement of the support tube, the notch comprising:
- a latch face extending generally perpendicular to the axis and having a pair of angularly offset ends, and
- a respective outwardly open indent at each of the ends of the latch face, the indents being adjacent and flanking the latch face and opening toward a base face.

\* \* \* \* \*